(12) United States Patent
Maegawa

(10) Patent No.: US 7,061,845 B2
(45) Date of Patent: Jun. 13, 2006

(54) WRITE CLOCK GENERATING CIRCUIT AND OPTICAL DISK APPARATUS

(75) Inventor: Hiroshi Maegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 41 days.

(21) Appl. No.: 10/506,215

(22) PCT Filed: Mar. 5, 2003

(86) PCT No.: PCT/JP03/02585

§ 371 (c)(1),
(2), (4) Date: Sep. 1, 2004

(87) PCT Pub. No.: WO03/075264

PCT Pub. Date: Sep. 12, 2003

(65) Prior Publication Data

US 2005/0105424 A1    May 19, 2005

(30) Foreign Application Priority Data

Mar. 5, 2002    (JP) ............................. 2002-058517

(51) Int. Cl.
*G11B 7/00* (2006.01)
*G11B 5/09* (2006.01)

(52) U.S. Cl. ............... 369/53.34; 369/59.15; 369/124.12

(58) Field of Classification Search ..................... None
See application file for complete search history.

(56) References Cited

U.S. PATENT DOCUMENTS

| | | | | |
|---|---|---|---|---|
| 5,508,991 A | * | 4/1996 | Onigata et al. | 369/44.13 |
| 6,081,490 A | | 6/2000 | Kuroda et al. | |
| 6,785,207 B1 | * | 8/2004 | Nishimura et al. | 369/47.27 |
| 6,891,782 B1 | * | 5/2005 | Saito et al. | 369/44.29 |
| 6,917,571 B1 | * | 7/2005 | Kusumoto et al. | 369/44.29 |
| 2001/0026512 A1 | | 10/2001 | Nishimura et al. | |

FOREIGN PATENT DOCUMENTS

| | | |
|---|---|---|
| JP | 8-194969 | 7/1996 |
| JP | 2000-67434 | 3/2000 |

* cited by examiner

*Primary Examiner*—Hoa T. Nguyen
*Assistant Examiner*—Christopher R. Lamb
(74) *Attorney, Agent, or Firm*—Dickstein Shapiro Morin & Oshinsky LLP

(57) ABSTRACT

A write clock generation circuit is provided that can detect wobble signal in high accuracy and can appropriately generate write clock with only small jitter even when the operation is switched from reproduction to recording. The wobble signal is obtained by changing stepwise the gain of a variable gain amp in the rear stage of a divided photo detector using a gain control circuit in a predetermined time period just after the beginning of recording. The write clock signal is generated using the above wobble signal. According to this arrangements, the change in wobble signal just before and after the beginning of recording can be reduced, and the gain change of a wobble signal amplitude regulation AGC is made slow. As a result, high frequency deviation of the wobble signal can be reduced even when the operation is switched from reproduction to recording, and the write clock with only small jitter can be generated.

16 Claims, 9 Drawing Sheets

WRITE CLOCK GENERATING CIRCUIT AND OPTICAL DISK APPARATUS

TECHNICAL FIELD

The present invention relates to a write clock generation circuit that generates write clock based on wobble signal acquired from wobbling track on a recording medium. The present invention further relates to an optical disk apparatus provided with the write clock generation circuit.

BACKGROUND ART

Information storage apparatuses (optical disk apparatuses) are practically used that write information on an optical disk, or read information written on an optical disk using a laser beam output from an optical pickup.

As the performance of personal computers (PC) is being improved, the personal computers become more capable of handling even audio-visual information such as music and video. Audio-visual information is usually very large in memory size. Optical disks have drawn attention as recording media for storing audio-visual information. Because the cost of optical disks is being reduced, as well as their high memory capacity, optical disk apparatuses have became the popular peripherals of personal computers.

Typically, a rewritable recording medium such as a CD-R/RW disk (Compact Disk-Recordable/Rewritable), a DVD–R/RW disk (Digital Versatile Disk), and a DVD+R/RW disk, is formatted so that, when rotated in a constant linear velocity mode, wobble signal detected from wobbling tracks formed on the recording medium becomes constant in order to accurately detect the linear velocity at each radial position.

Wobble signal always needs to be detected, regardless of reading or writing. However, data written on the recording medium and/or modulated laser beam for writing data become the source of noise, and may degrade the quality of wobble signal. That is, wobble signal is included in reflective light from a track, but the reflective light complicatedly includes components that becomes noise to the wobble signal due to data written on the optical disk and/or the power modulation of laser beam for writing data on the optical disk.

Wobble signal is generally extracted in the following manner. The reflective light from a track is received by a photo detector divided into two parts with respect to tangential direction to the track. Noise component included in the reflective light is removed by subtracting output signal from one part of the divided photo detector from output signal from the other part.

Before an optical disk apparatus is shipped from a manufacturing plant, the divided photo detector is aligned so that the reflective light from a track hits the center of the photo detecting surface of the divided photo detector. However, the reflective light may deviate from the center of the photo detecting surface due to temperature change during operation and/or change over time due to vibration. In such a case, because the output signal from each part of the divided photo detector includes different noise component, the noise components may remain un-canceled even if output signal of one part is subtracted from output signal of the other.

To solve such a problem, Japanese Laid-Open Patent Application No. 8-194969, for example, discloses a method of detecting wobble signal in which data signal component can be clearly removed by normalizing (so-called amplitude regulation automatic gain control (AGC)) the amplitude of output signals from a photo detector divided in the tangential direction of a track and by generating the wobble signal based on the difference between the output signals. This application further discloses an embodiment in which, when an optical disk on which data has not yet been written is read, amplitude regulation AGC is not used since the data signal component does not need to be removed. A determination is made of whether the amplitude regulation AGC circuit is used based on a determination of whether data has been written on the optical disk.

This application No. 8-194969 provides a method of detecting wobble signal in which wobble signal of high quality can be obtained during reproduction of signal from an optical disk. However, the method disclosed in this application is not applicable to wobble signal detection while data is being written.

Particularly, the above method does not take into account the switching of operation from data-reading to data-writing, and fails to obtain good wobble signal during time period in which reproduction is ended and recording is started. As a result, accurate write clock cannot be generated based on such a wobble signal of low quality. That is to say, laser power for data-reading is different from laser power for data-writing, and as a result, the levels of detected wobble components are different. As will be appreciated, when operation is switched from data-reading to data-writing, if the operation is not adequately controlled, the slice voltage of made-binary wobble signal may be deviated (hysteresis, for example). The deviation may cause jitter (deviation over time), which may result in that PLL circuit fails to lock in write clock and operates unstably.

DISCLOSURE OF THE INVENTION

It is an object of the present invention to provide a write clock generation circuit that can detect wobble signal at high accuracy even in time in which operation is switched from data-reading to data-writing, and generate suitable write clock containing only a little jitter. Another object of the present invention is to provide an optical disk apparatus that is provided with such a write clock generation circuit.

At the same time, according to the present invention, a write clock generation circuit of which circuit scale can be made more compact can be provided.

According to the present invention, a write clock generation circuit that can generate accurate write clock regardless of whether data has been written on the recording medium or not.

According to the present invention, a write clock generation circuit that ensures to prevent PLL circuit from being out of lock, and can generate write clock with only a little jitter.

According to an aspect of the present invention, a write clock generation circuit for generating write clock from wobble signal based on a wobbling track formed on a recording medium includes: two variable gain amps that amplify respective signals from a photo detector divided into two portions with a dividing line in a tangential direction of the track at a determined gain; a gain control circuit that determines the gain of the variable gain amps in a particular period immediately after data-writing has been started by varying the gain of the variable gain amps stepwise; a subtractor that produces wobble signal by subtracting outputs from the respective variable gain amps; a wobble amplitude regulation AGC circuit that automatically controls gain thereof so as to regulate amplitude of the wobble signal output therefrom; a making-binary circuit that digitizes signals output from the wobble amplitude regulation AGC circuit into made-binary wobble signal; and a PLL circuit that generates write clock using the made-binary wobble signal as a reference.

The write clock is generated based on a wobble signal obtained by changing stepwise the gain of the variable gain amps at the rear stage of the divided photo detectors by the gain control circuit in a predetermined time period just after the beginning of recording. According to this arrangement, the change in the wobble signal can be reduced just before and after the beginning of recording, and the change in the gain of wobble signal amplitude regulation AGC circuit can be made slow. Accordingly, the high frequency deviation of the wobble frequency can be reduced even when the operation is switched between reproduction and recording, which results in the generation of write clock with only small jitter. Once the gain of the variable gain amps is changed stepwise for the last time, appropriate signal level can be sustained, which results in the generation of steady write clock.

According to another aspect of the present invention, a write clock generation circuit for generating write clock from wobble signal based on a wobbling track formed on a recording medium includes: a subtractor that produces wobble signal by subtracting respective signals from a photo detector divided into at least two portions with a dividing line in a tangential direction of the track; a variable gain amp that amplifies the wobble signal output from the subtractor at a determined gain; a gain control circuit that determines the gain of the variable gain amps in a particular period immediately after data-writing has been started by varying the gain of the variable gain amps stepwise; a wobble amplitude regulation AGC circuit that automatically controls gain thereof so as to regulate amplitude of the wobble signal output from the variable gain amp; a making-binary circuit that digitizes signals output from the wobble amplitude regulation AGC circuit into made-binary wobble signal; and a PLL circuit that generates write clock using the made-binary wobble signal as a reference.

The write clock is generated based on a wobble signal obtained by changing stepwise the gain of the variable gain amps at the rear stage of the divided photo detectors by the gain control circuit in a predetermined time period just after the beginning of recording. According to this arrangement, although the write clock generation circuit becomes compact, the same function and effect can be achieved.

According to yet another aspect of the present invention, either one of the above write clock generation circuits may be characterized in that the gain control circuit once reduces the gain of the variable gain amps to a level lower than a gain level of data-reading in the particular period immediately after data-writing has been started, and increases stepwise the gain of the variable gain amps to a gain level of data-reading.

The wobble signal input to the variable gain amp is great just after the beginning of recording. If the gain is set is lower than the gain of reproduction operation, the wobble signal that is not different from the wobble signal in the reproduction operation can be obtained. On the other hand, since noise is great in the recording operation after the steady state, the gain of the variable gain amp is preferable to be great. Thus, the wobble signal can be surely obtained, and as a result, the write clock can be generated appropriately by increasing the gain stepwise up to the gain level of reproduction operation.

According to yet another aspect of the present invention, either one of the above write clock generation circuits may be further characterized in that the gain control circuit (23) varies gain steps and time intervals of the variable gain amps to an extent in which the wobble amplitude regulation AGC circuit can follow in the particular period immediately after data-writing has been started.

According to the above arrangement, the wobble amplitude regulation AGC circuit can surely follow the stepwise change in the gain of the variable gain amp. The write clock can be generated appropriately.

According to yet another aspect of the present invention, either one of the above write clock generation circuits may be characterized in that the gain control circuit switches the gain of the variable gain amps before data-writing is begun in accordance with whether a preceding region to data-writing starting position is data-written or data-not-yet-written, so that amplitude of the wobble signal immediately before the data-writing starts and amplitude of the wobble signal immediately after the data-writing starts become substantially equal.

The gain of the variable gain amp before the beginning of recording is switched in accordance with whether the region immediately preceding to the data-writing starting position is data-not-yet-written or data-written, and the amplitudes just before and after the beginning of recording (data-writing) are at the same level. According to the above arrangement, regardless of the recording state of the recording medium (data-not-yet-written or data-written), the change in the wobble signal just before and after the beginning of recording (data-writing) can be reduced, and the gain change of the wobble amplitude regulation AGC circuit can be made slow. As a result, the high frequency deviation of the wobble frequency can be reduced, which results in the generation of write clock with only small jitter.

According to yet another aspect of the present invention, either one of the above write clock generation circuits may further includes a PLL gain control circuit that determines loop gain of the PLL circuit so as to increase the loop gain in a predetermined time period immediately after the beginning of data-writing.

The loop gain of the PLL circuit is increased during a predetermined time period just after the beginning of recording. According to the above arrangement, the drawing-in capability of the PLL circuit is increased during the time period in which the change in wobble signal is expected to be great so as to prevent the PLL circuit from being disengaged from the locked state, and once the wobble signal becomes steady, a write clock with only a small jitter can be generated.

According to yet another aspect of the present invention, either one of the above write clock generation circuit may be characterized in that the PLL gain control circuit sets the loop gain of the PLL circuit at a high level in a predetermined time period just after the beginning of data-writing and then, sets the loop gain at a low level.

The loop gain of the PLL circuit is increased to a high level just after the beginning of recording. According to the above arrangement, even if high frequency deviation is caused in the binary wobble signal caused by the change in quality and amplitude of the wobble signal, the wobble signal can be prevented from being disengaged from the locked state. In addition, once the wobble signal becomes steady, the write clock with only small jitter can be generated by lowering the gain.

According to yet another aspect of the present invention, either one of the above write clock generation circuits may be characterized in that the PLL gain control circuit can change the loop gain of the PLL circuit stepwise from the high level to the low level.

The loop gain of the PLL circuit is set at a high level just after the beginning of recording. According to this arrangement, even if the quality and amplitude of the wobble signal changes when the operation is switched from reproduction to recording and consequently, high frequency deviation occurs in the made-binary wobble signal, the wobble signal can be surely prevented from being disengaged from the locked state. Additionally, the preferable write clock with only small jitter can be generated by lowering the loop gain stepwise to the step in which the wobble signal becomes steady.

According to an aspect of the present invention, an optical disk apparatus includes: a rotation mechanism that rotates a recording medium, wherein a wobbling track is formed on a recording surface of the recording medium; an optical pickup comprising a photo detector divided into at least two portions by a dividing line in a tangential direction of the track, and a laser light source that emits a laser beam to the recording medium; a light source driving circuit that controls the light emission of the light source; and the write clock generation circuit as claimed in claim 1 that receives signals output by the divided photo detector, and outputs write clock to the light source driving circuit.

Because the above write clock generation circuit is used, recording may not fail due to the disengagement of the PLL circuit from the locked state. Additionally, the recording quality when the recording is begun can be retained at a high level.

BEST MODE FOR CARRYING OUT THE INVENTION

Figure 1:
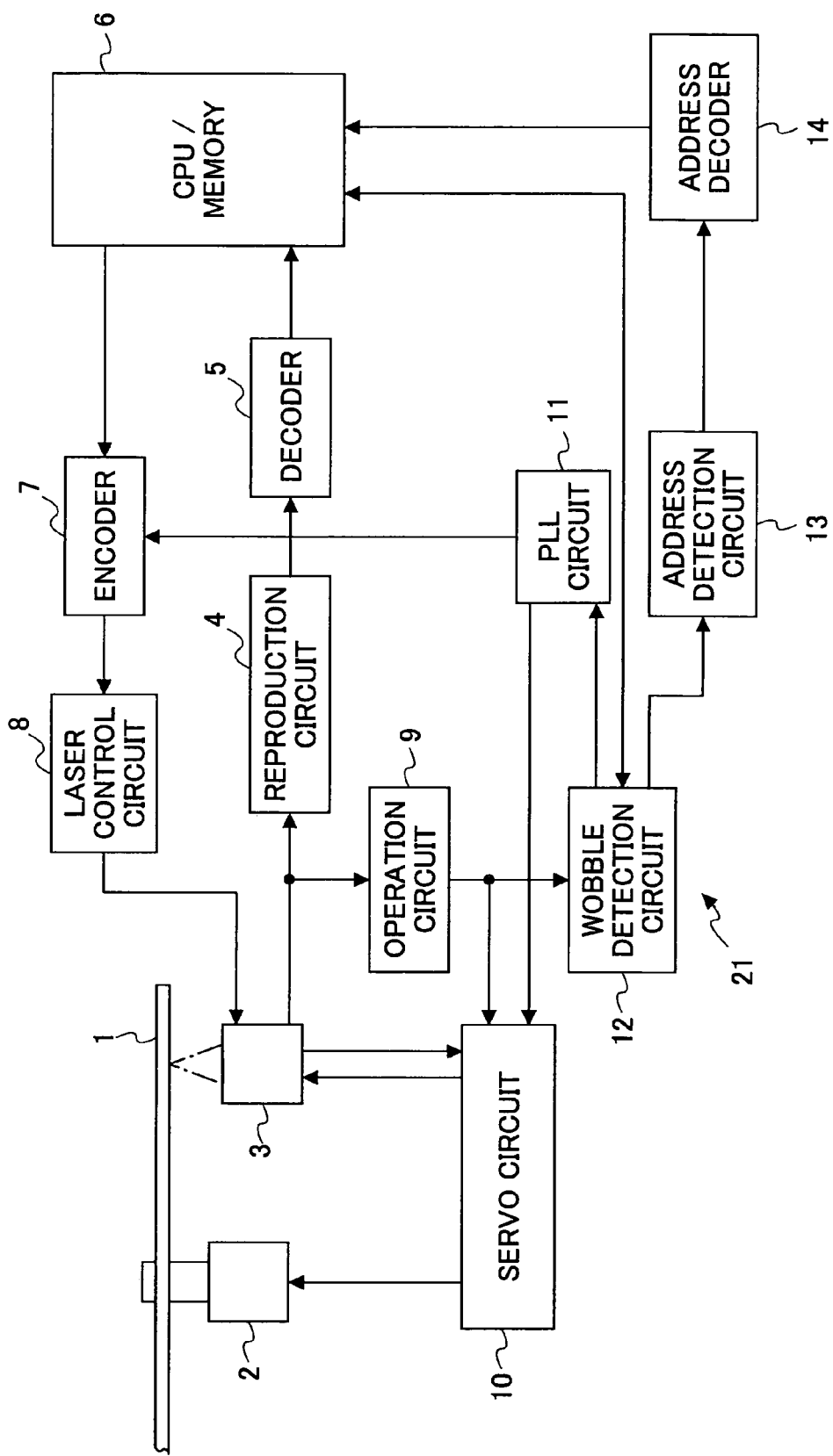
FIG. 1 is a block diagram illustrating the structure of an optical disk apparatus according to a first embodiment of the present invention.

A first embodiment of the present invention is described with reference to FIGS. 1–6. The structure and function of an optical disk apparatus to which the present invention is applicable is described with reference to FIG. 1.

The optical disk drive is provided with a spindle motor 2 that mainly constitutes a rotation mechanism that rotates a rewritable recording medium 1 such as a CD-R/RW and a DVD±R/RW. The optical disk drive is further provided with an optical pickup 3 that applies a beam spot of a laser beam emitted by a laser light source (not shown) to the rotated recording medium 1, and detects reflective light from the recording medium 1 using a divided photo detector (to be described below).

The following are connected to the optical pickup 3 in that order: a reproduction circuit 4 that filters a detected reproduced signal and makes it into digital signal, and a decoder 5 that converts the data format of user data component generated by the reproduction circuit 4. The data-format-converted user data component can be transferred to an external host computer (not shown) via a CPU 6.

On the other hand, information to be recorded is transferred from the external host to an encoder 7 via the CPU 6. The encoder 7 converts the data format of the information, and a laser control circuit 8, that is, a light source drive circuit controls the light emission of the laser light source in the optical pickup 3 in accordance with information bits thereby to writes the information on the recording medium 1.

The optical disk drive is further provided with an operation circuit 9 that generates servo signal based on output signal obtained from the divided photo detector in the optical pickup 3. The optical disk drive is configured to control the position of an optical lens (not shown) in the optical pickup 3 by outputting the servo signal to a servo circuit 10. This servo circuit 10 controls the rotation of the spindle motor 2 based on write clock signal obtained from PLL circuit 11.

The optical disk drive is also provided with a wobble detection circuit 12 to which the output signal from the divided photo detector is fed after the operation by the operation circuit 9. The wobble detection circuit 12 extracts the wobble signal. The wobble signal output from the wobble detection circuit 12 is fed to the PLL circuit 11, which generates the write clock signal based on the wobble signal. According to the above arrangements, an accurate write clock in synchronization with the rotation of the recording medium 1 can be generated. The PLL circuit 11 and the wobble detection circuit 12 constitutes a write clock generation circuit according to the present invention.

Since the wobble signal contains physical address information, the wobble signal is transferred to an address detection circuit 13 and converted into address information by an address decoder 14 thereby to reproduce address information of current accessing position.

Figure 2:
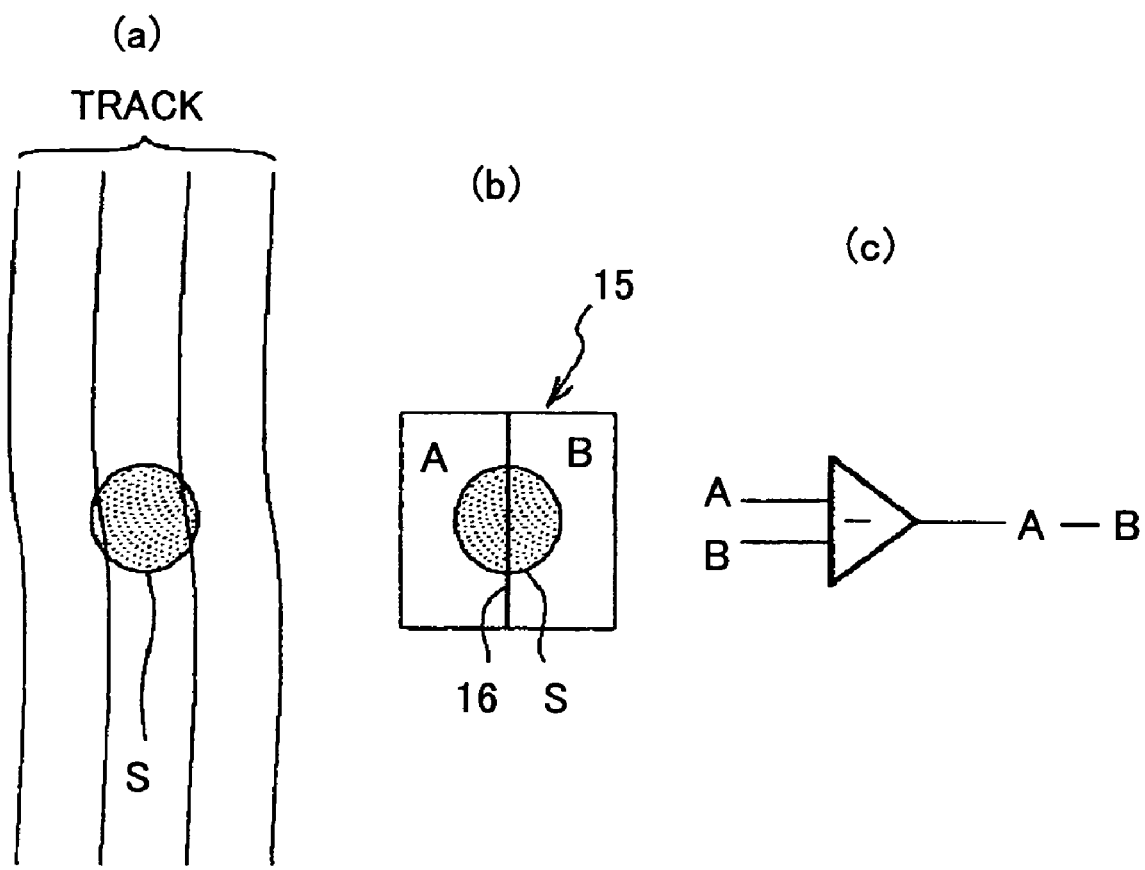
FIG. 2 includes schematic diagrams for explaining a recording medium and a divided photo detector according to an embodiment.

An exemplary recording medium 1 and an exemplary divided photo detector that are used for the present embodiment are described with reference to FIG. 2. As shown in FIG. 2(a), a wobbling spiral track or wobbling concentric tracks is formed on the recording medium 1. As shown in FIG. 2(b), the divided photo detector 15 receives a reflective signal from the spot S on the recording medium 1, and is provided with two photo detection regions A and B divided by a division line 16 corresponding the tangential direction of the track. As shown in FIG. 2(c), one of the simplest operations for obtaining the wobble signal is to produce the difference (A–B) between photo detection amounts of the photo detection regions A and B of the divided photo detector. Of course, the photo detector of the optical pickup 3 may be divided into 4 or more photo detection regions, instead of two. In such a case, the 4 or more photo detection regions may be grouped for the similar operation in accordance with the two photo detection regions divided by the division line 16.

Figure 3:
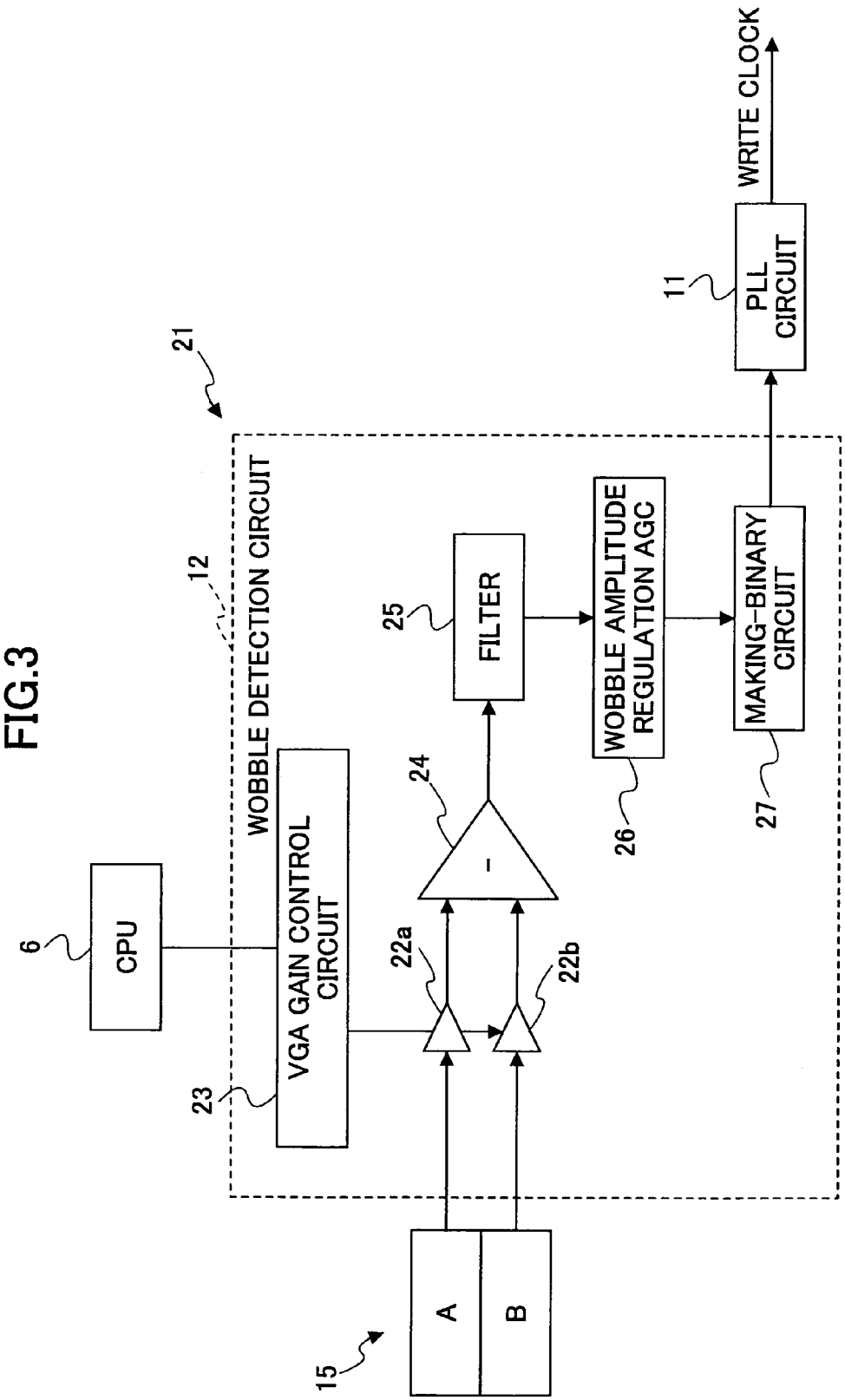
FIG. 3 is a block diagram illustrating a write clock generation circuit according to an embodiment.

Based on the above presumed configuration of the optical disk drive, the write clock generation circuit 21 according to the present embodiment is structured as shown in FIG. 3. As described above, the write clock generation circuit 21 includes the wobble detection circuit 12 and the PLL circuit 11. The wobble detection circuit 12 is provided with two variable gain amps VGA 22a and 22b to which output signals from the photo detection regions A and B of the divided photo detector 15 of the optical pickup 3 via the operation circuit 9. The variable gain amps VGA 22a and 22b amplify or attenuate the output signals from the photo detection regions A and B in accordance with a desired gain. The wobble detection circuit 12 is further provided with a VGA gain control circuit 23 that controls the gain of the variable gain amps VGA 22a and 22b. The VGA gain control circuit 23 may automatically control the gain of the variable gain amps VGA 22a and 22b in accordance with the operational state (writing or reading, for example) of the optical disk drive. In this embodiment, the VGA gain control circuit 23 is configured to control the gain of the variable gain amps VGA 22a and 22b based on an instruction from the CPU 6.

A subtractor 24 is connected to the outputs from the variable gain amps VGA 22a and 22b. The subtractor 24 outputs the wobble signal by producing difference between the output signals from the variable gain amps VGA 22a and 22b. A filter circuit 25 is connected to the rear stage of the subtractor 24. The wobble signal output by the subtractor 24 contains noise component other than a real wobble signal caused by, for example, the leakage of data signal written on the recording medium and the DC offset due to positional deviation of the optical pickup 3. The filter circuit 25 extracts only needed frequency component. Particularly, the filter circuit 25 may be a combination of a low-pass filter LPF and a high-pass filter HPF, or a band-pass filter BPF. After frequency separation by the filter circuit 25, the wobble signal is fed to a wobble amplitude regulation AGC (automatic gain control) circuit 26 that regulates the wobble signal amplitude that is high enough to make the wobble signal binary. A making-binary circuit 27 that makes the wobble signal into binary data is connected to the rear stage of the wobble amplitude regulation AGC 26. The PLL circuit 11 generates the write clock based on the binary wobble signal output from the making-binary circuit 27. The filter circuit 25 may be provided after the wobble amplitude regulation AGC circuit 26.

Figure 4:
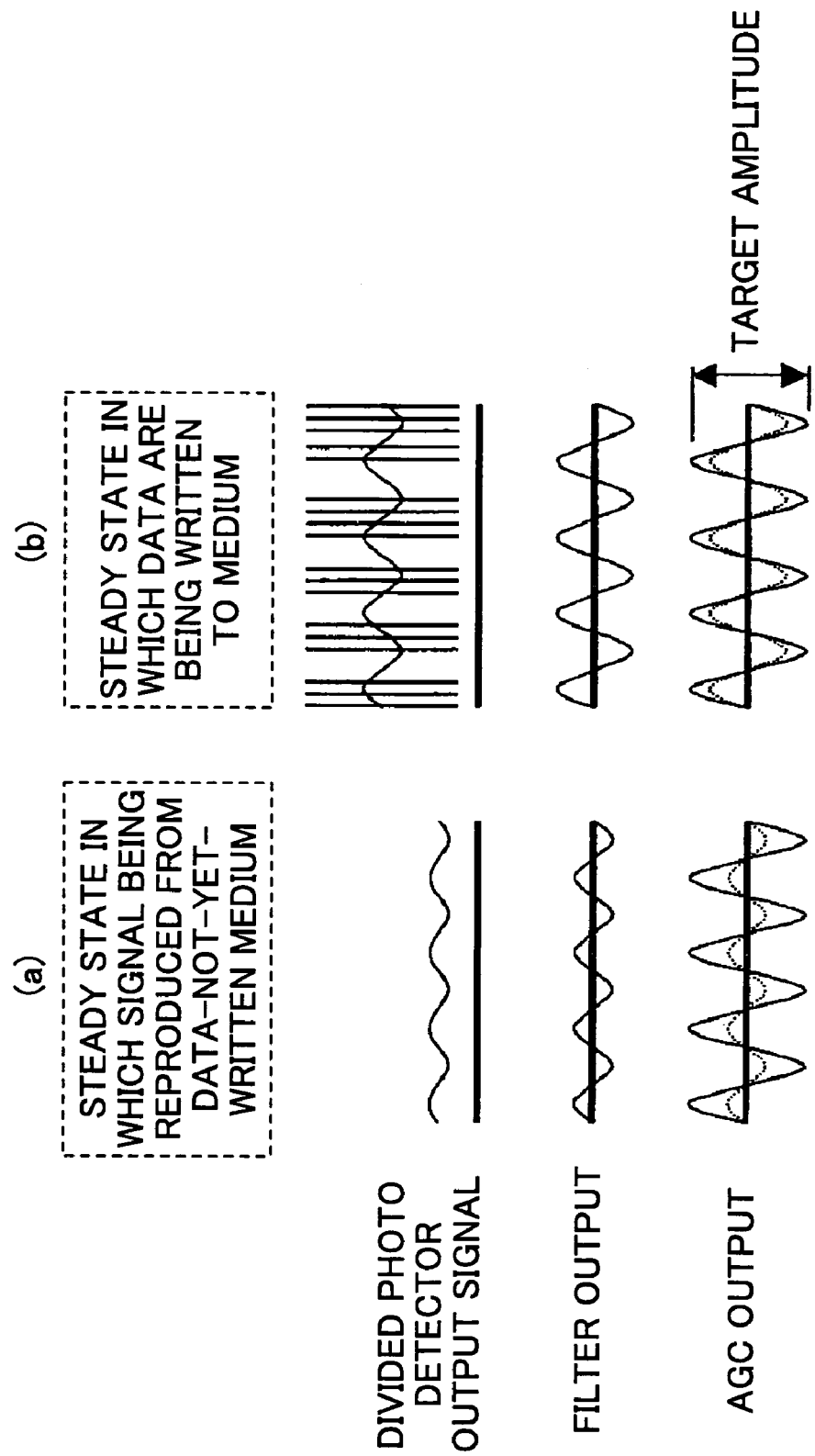
FIG. 4 illustrates waveforms showing signals in a steady state according to an embodiment.

Based on the above configuration, signal waveforms in a steady state (not immediately after the switching between reproduction and recording, but a predetermined time period after the switching in which the wobble signal remains steady) are described with reference to FIG. 4. As shown in FIG. 4(*a*), in a steady state in which signal being reproduced from a recording medium on which data has not yet been written (data-not-yet-written medium), the DC level of the output signal from the divided photo detector 15 is low because the laser power is low. At the output of the filter circuit 25 after the subtraction by the subtractor 24, the DC component of the output signal from the divided photo detector 15 has been removed, and only the wobble component is extracted. The wobble signal is amplified by the wobble amplitude regulation AGC circuit 26 (amplified from the dotted line to the block line) so that the amplitude of the wobble signal is increased to a level great enough to make the wobble signal binary or to detect address information (the wobble signal of some format may contain address information superposed thereon). At this time, the AGC gain is great.

On the other hand, as shown in FIG. 4(*b*), in a steady state in which data are being written to the recording medium, the light emitting component of the laser light source is superposed on the output signal from the divided photo detector 15. Since the laser power is great, the wobble component is also great. If the light emitting component and the DC component are removed by the subtractor 24 and the filter circuit 25, a greater wobble signal can be obtained compared with the state in which signal being reproduced from a data-not-yet-written medium. Accordingly, the wobble amplitude regulation AGC circuit 26 amplifies the wobble signal at a lower gain from the dotted line to the block line.

Figure 5:
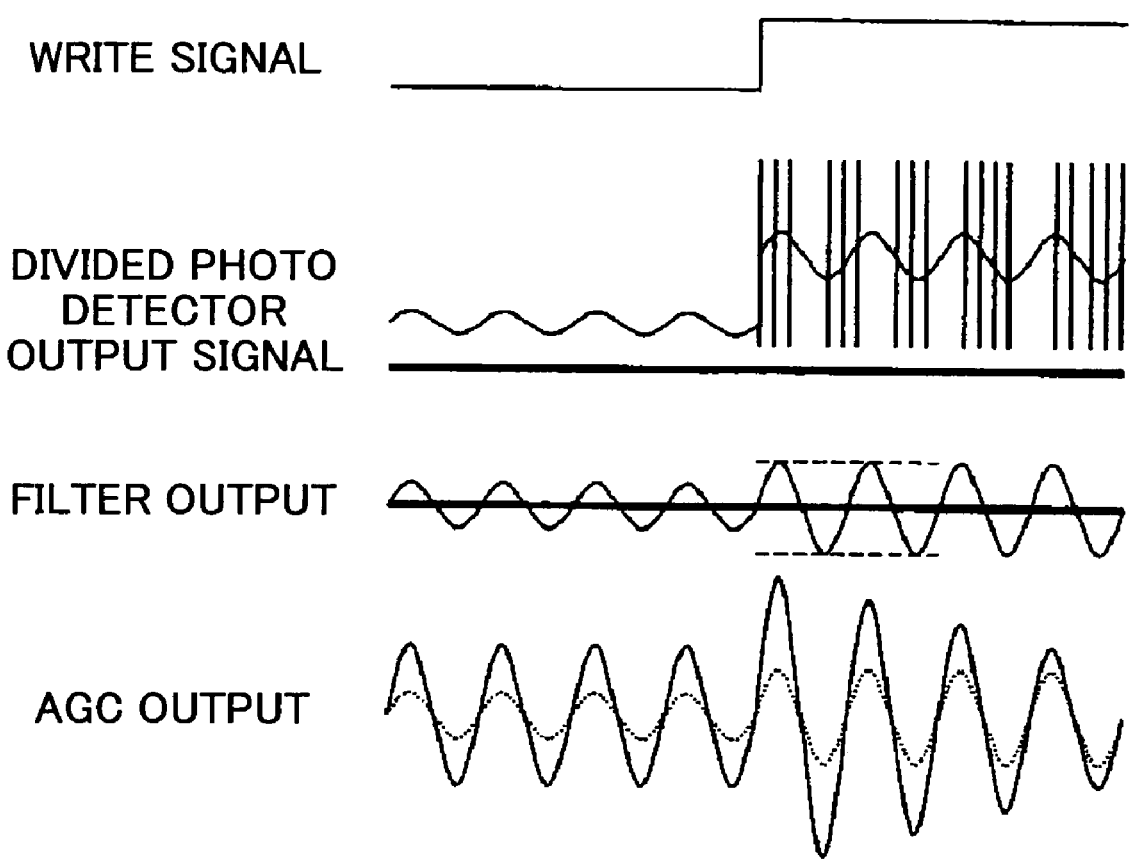
FIG. 5 illustrates waveforms showing signals in which VGA gain is fixed according to an embodiment.

Referring to FIG. 5, a description is given about the waveforms in the case in which, while the gain of the variable gain amps VGA 22a and 22b is fixed, the operation is switched from reproduction to recording. The waveforms in this case are similar to those of the steady state in which signal being reproduced from a data-not-yet-written medium (not-written reproduction steady state) and those of the steady state in which data are being written to the recording medium (recording steady state) combined together. If the AGC is sustained at a high level of the not-written reproduction steady state, a wobble signal of great amplitude is input. The amplitude of output from the wobble amplitude regulation AGC circuit 26 becomes very great immediately after the beginning of data-writing. As a result, jitter (deviation over time) may be caused due to deviation (hysteresis, for example) in slice voltage of the binary wobble signal in the rear stage. The jitter may disengage locked write clock, and makes the write clock unstable.

Figure 6:
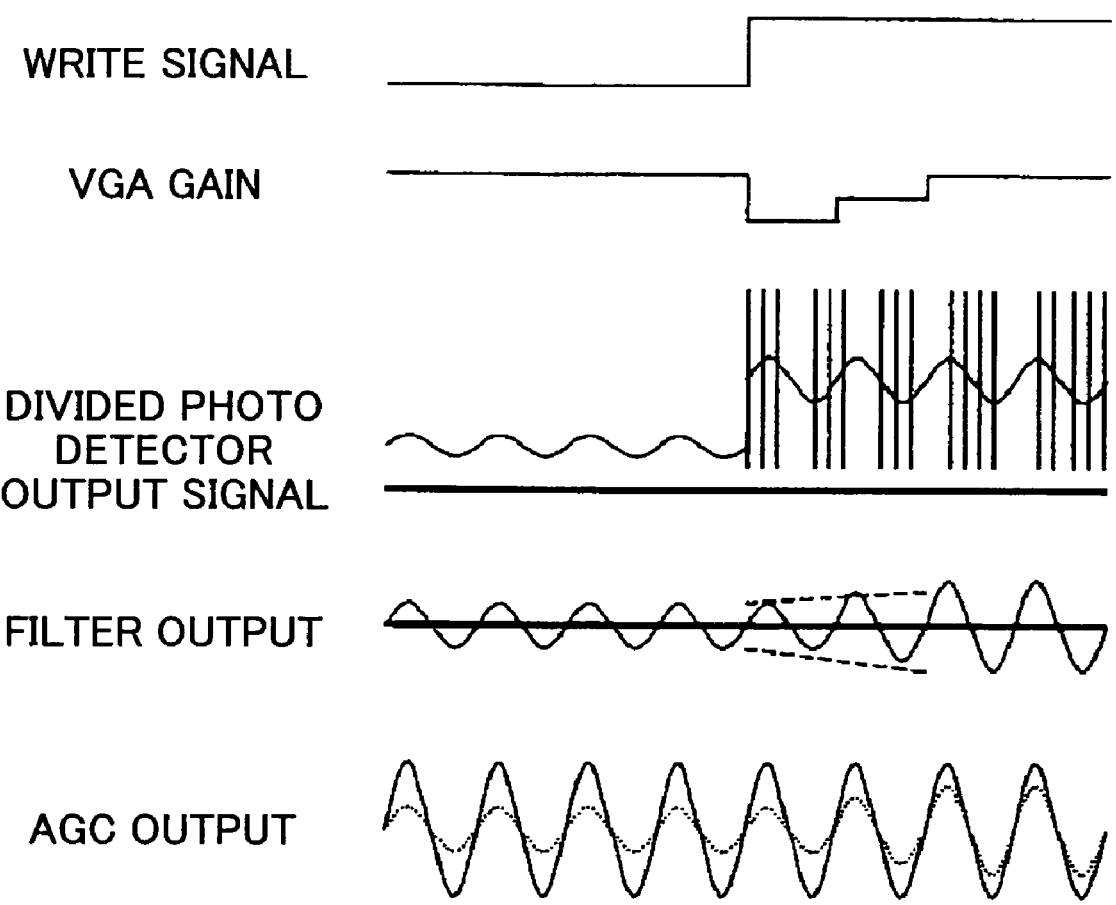
FIG. 6 illustrates waveforms showing signals in which VGA gain is changed stepwise according to an embodiment.

Taking the above problems into account, according to the present embodiment, when the operation is switched from reproduction to recording, the VGA gain control circuit 23 changes stepwise the gain of the variable gain amps VGA 22a and 22b in a predetermined time period immediately after the beginning of data-writing. FIG. 6 shows an exemplary operation in which the gain of the gain amp VGA 22a and 22b is changed stepwise immediately after the beginning of data-writing.

That is to say, since the wobble signal input to the wobble amplitude regulation AGC circuit 26 is great immediately after the beginning of data-writing, the gain of the gain amps VGA 22a and 22b are set at a low level for the meantime. According to this arrangement, wobble signal that is at the same level as that during reproduction can be obtained. However, since noise component due to the modulation of laser emission is great during recording, the gain of the gain amp VGA 22a and 22b is preferably great when the operation change to the recording steady state. Thus, the gain of the gain amps VGA 22a and 22b is increased stepwise. The step for which the gain is increased and time for which the gain is kept constant may be determined so that the wobble amplitude regulation AGC circuit 26 in the rear stage can easily follow change in the gain, and the output of the wobble amplitude regulation AGC circuit 26 does not change too much.

As described above, according to the present embodiment, the gain of the VGA gain control circuit 23 is changed stepwise thereby to obtain the wobble signal in a predetermined time period immediately after the beginning of recording. The write clock is generated based on the above wobble signal. According to this arrangement, the change in wobble signal before and after the beginning of recording can be reduced, and the change in gain of the wobble amplitude regulation AGC circuit 26 can be made small and smooth. Therefore, even when reproduction and recording are switched, the high frequency deviation of the wobble frequency can be reduced, which results in the generation of write clock with only small jitter. After the gain of the variable gain amps VGA 22a and 22b is finally changed stepwise, the signal level can be kept at preferable level in the recording. Accordingly, steady write clock can be generated. In addition, the wobble amplitude regulation AGC circuit 26 can surely follow the stepwise change of the gain of the variable gain amps VGA 22a and 22b. As a result, the write clock can be appropriately generated. Furthermore, even if the wobble amplitude regulation AGC circuit 26 needs to be fine tuned, no special switching feature, for example, is required, and no special external component is required. The write clock generation circuit can be embedded in a LSI.

Figure 7:
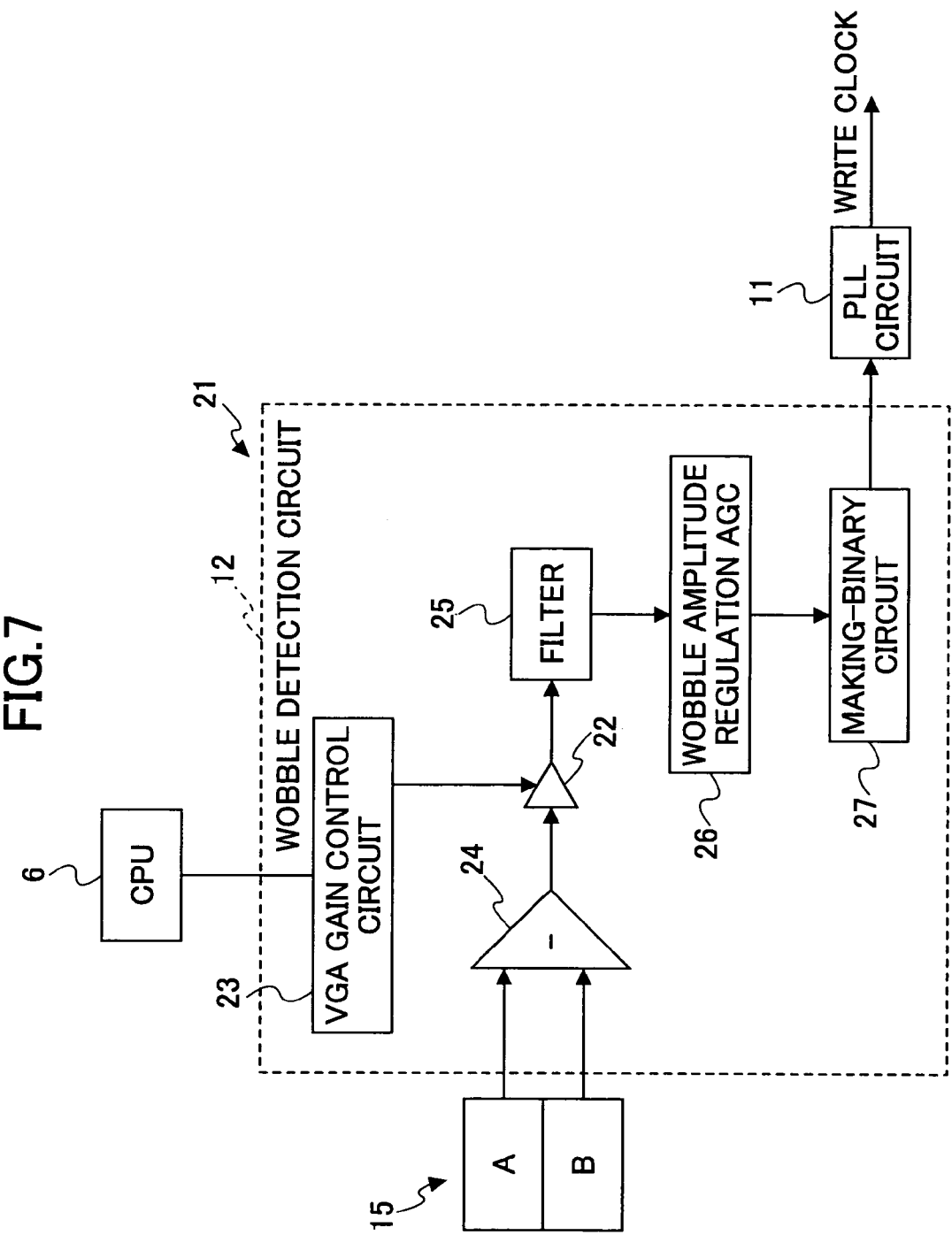
FIG. 7 is a block diagram illustrating a write clock generation circuit according to a second embodiment of the present invention.

A second embodiment of the present invention is described below with reference to FIG. 7. Portions identical to those of the first embodiment are referred to by the same reference symbols, and their description is omitted. The order of the variable gain amps and the subtractor is opposite in the present embodiment. The difference between the output signals from the divided photo detector 15 is generated by the subtractor 24 into the wobble signal. The wobble signal is fed to the variable gain amp VGA 22, and is amplified or attenuated in accordance with the gain.

The operation of the write clock generation circuit according to the second embodiment is similar to that of the write clock generation circuit according to the first embodiment. According to the present embodiment, since only one variable gain amp VGA is required, the write clock generation circuit becomes smaller in circuit scale than the write clock generation circuit according to the first embodiment, but is the same in effects.

A third embodiment of the present invention is described below with reference to FIG. 8. In the present embodiment, the gain of the variable gain amps VGA 22a and 22b (or 22) before the beginning of recording is switched in accordance with whether the region preceding to the position at which recording is begun is a data-not-yet-written region or a data-written region. According to the above arrangement, the amplitude of wobble signal immediately before and after the beginning of recording can be substantially the same level.

Figure 8:
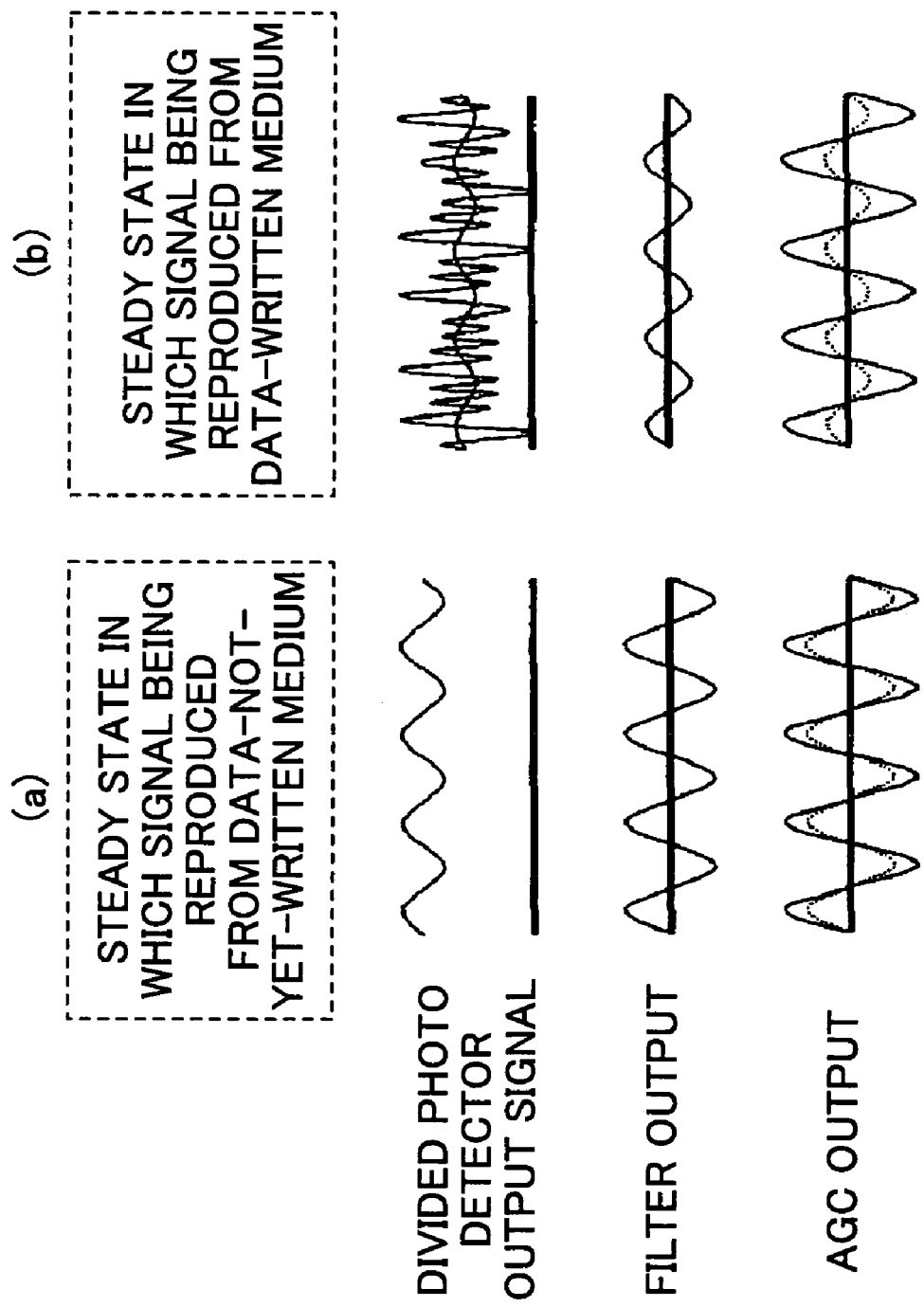
FIG. 8 illustrates waveforms showing signals in respective data-writing states according to a third embodiment.

A detailed description is given with reference to FIG. 8. FIG. 8(a) shows waveforms in a steady state in which signal being reproduced from the data-not-yet-written medium (a recording medium on which data has not yet been written), and FIG. 8(b) shows waveforms in a steady state in which signal being reproduced from the data-written medium (a recording medium on which data has been written). When signal is reproduced from a data-written region, data signal component is superposed on the output signal from the divided photo detector 15, and thus the average signal level of the data-written region becomes smaller than that of the data-not-yet-written region. Thus, the wobble signal becomes small. In order to make the amplitude of the wobble signal immediately after the beginning of recording equal to that of the wobble signal just before the beginning of recording, the gain of the variable gain amps VGA 22a and 22b (or 22) needs to be changed in accordance with whether the region preceding to the data-writing starting position is data-not-yet-written or data-written. Typically, information about the region of the recording medium 1 in which data has been written (data-written) is available. The setting of the VGA gain control circuit 23 may be adjusted by the CPU 6, for example, in accordance with the information.

According to the above arrangement, according to the present embodiment, the change in the wobble signal before and after the beginning of recording can be reduced regardless of the recording state (data-not-yet-written/data-written) of the recording medium 1, and the change in gain of the wobble amplitude regulation AGC circuit 26 can be small and smooth. Accordingly, the high frequency deviation of the wobble frequency can be reduced, which results in the generation of write clock with only small jitter.

Figure 9:
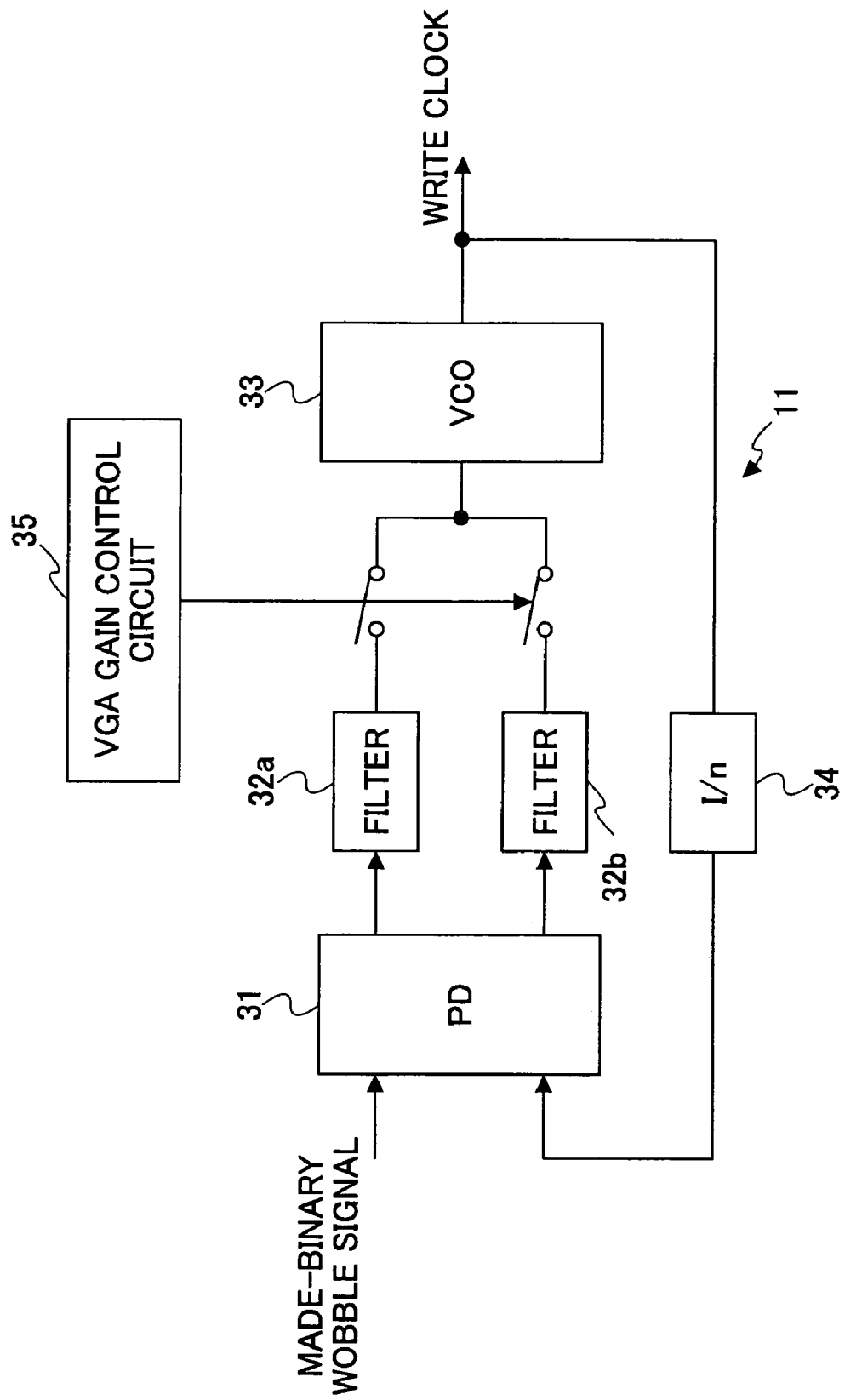
FIG. 9 is a block diagram illustrating PLL circuit according to a fourth embodiment.

A fourth embodiment of the present invention is described below with reference to FIG. 9. This embodiment relates to the structure of the PLL circuit 11 provided in the write clock generation circuit 21. As known, the PLL circuit 11 is basically a loop circuit provided with PD (phase comparator) 31, filter 32, VCO (voltage controlled oscillator) 33, 1/n divider 34. The PLL circuit 11 according to the present embodiment is provided with two or more filters 32a and 32b of which properties are different. PLL gain control circuit 35 can switch the gain of the PLL circuit 11.

Generally, the PLL circuit only needs to follow low frequency change in frequency caused by the rotation of the recording medium 1. The loop gain is designed to be relatively low in order to reduce the jitter of the write clock. However, the quality and amplitude of the wobble signal changes before and after the beginning of reproduction and recording as described above. As a result, high frequency deviation may be caused in the binary wobble signal obtained from the make-binary circuit 27. If the loop gain is unchanged, the PLL circuit 11 may easily be disengaged from locked state. In the present embodiment, as described above, the loop gain can be switched by the PLL gain control circuit 35.

The output signal of VCO (voltage controlled oscillator) 33 is the write clock. The phase of 1/n-divided write clock (n: division ratio that makes 1/n-divided write clock is equal in frequency as wobble signal) output from the 1/n-divider 34 is compared with the phase of the binary wobble signal output from the making-binary circuit 27 by the PD (phase comparator) 31. The result of the comparison is provided to one of the multiple filters 32a and 32b of which properties are different, and the output signal from the one of the filters is fed to the VCO 33 so as to determine the oscillation frequency of the VCO 33. The multiple filters 32a and 32b are switched, or are turned on/off, by the PLL gain control circuit 35 so as to change the loop gain of the PLL circuit 11. Particularly, the loop gain is increased just after the beginning of recording (data-writing), and when the wobble signal becomes steady, the loop gain is decreased. If multiple PLL gains are available, the loop gain may be reduced stepwise after the beginning of recording in the same manner as the variable gain amps VGA 22a and 22b.

As described above, according to the present embodiment, the loop gain of the PLL circuit 11 is increased in a predetermined time period just after the beginning of recording. According to this arrangement, the PLL circuit 11 can be prevented from being disengaged from the locked state by increasing the drawing-in capability only during a time period in which the wobble signal is expected to be great. At the same time, once the wobble signal becomes steady, a preferable write clock signal having only small jitter can be generated.

INDUSTRIAL APPLICABILITY

According to an aspect of the present invention, the write clock is generated based on a wobble signal obtained by changing stepwise the gain of the variable gain amps at the rear stage of the divided photo detectors by the gain control circuit in a predetermined time period just after the beginning of recording. According to this arrangement, the change in the wobble signal can be reduced just before and after the beginning of recording, and the change in the gain of wobble signal amplitude regulation AGC circuit can be made slow. Accordingly, the high frequency deviation of the wobble frequency can be reduced even when the operation is switched between reproduction and recording, which results in the generation of write clock with only small jitter. Once the gain of the variable gain amps is changed stepwise for the last time, appropriate signal level can be sustained, which results in the generation of steady write clock.

According to another aspect of the present invention, the write clock is generated based on a wobble signal obtained by changing stepwise the gain of the variable gain amps at the rear stage of the divided photo detectors by the gain control circuit in a predetermined time period just after the beginning of recording. According to this arrangement, although the write clock generation circuit becomes compact, the same function and effect can be achieved.

According to yet another aspect of the present invention, because the above write clock generation circuit is used, recording may not fail due to the disengagement of the PLL circuit from the locked state. Additionally, the recording quality when the recording is begun can be retained at a high level.

The invention claimed is:

1. A write clock generation circuit for generating write clock from wobble signal based on a wobbling track formed on a recording medium, comprising:
   two variable gain amps that amplify respective signals from a photo detector divided into two portions by a dividing line in a tangential direction of the track at a determined gain;
   a gain control circuit that determines the gain of said variable gain amps in a particular period immediately after the beginning of data-writing by varying the gain of said variable gain amps stepwise;
   a subtractor that produces wobble signal by subtracting outputs from said respective variable gain amps;
   a wobble amplitude regulation AGC circuit that automatically controls gain thereof so as to regulate amplitude of the wobble signal output therefrom;
   a making-binary circuit that digitizes signals output from said wobble amplitude regulation AGC circuit into made-binary wobble signal; and
   a PLL circuit that generates write clock using the made-binary wobble signal as a reference.

2. The write clock generation circuit as claimed in claim 1, wherein said gain control circuit once reduces the gain of said variable gain amps to a level lower than a gain level of data-reading in the particular period immediately after the beginning of data-writing, and increases stepwise the gain of said variable gain amps to a gain level of data-reading.

3. The write clock generation circuit as claimed in claim 1, wherein said gain control circuit varies gain steps and time intervals of said variable gain amps to an extent in which said wobble amplitude regulation AGC circuit can follow in the particular period immediately after data-writing has been started.

4. The write clock generation circuit as claimed in claim 1, wherein said gain control circuit switches the gain of said variable gain amps before data-writing is begun in accordance with whether a preceding region to data-writing starting position is data-written or data-not-yet-written, so that amplitude of the wobble signal immediately before the data-writing starts and amplitude of the wobble signal immediately after the data-writing starts become substantially equal.

5. The write clock generation circuit as claimed in claim 1, further comprising a PLL gain control circuit that determines loop gain of said PLL circuit so as to increase the loop gain in a predetermined time period immediately after the beginning of data-writing.

6. The write clock generation circuit as claimed in claim 5, wherein said PLL gain control circuit sets the loop gain of said PLL circuit at a high level in a predetermined time period just after the beginning of data-writing and then, sets the loop gain at a low level.

7. The write clock generation circuit as claimed in claim 6, wherein said PLL gain control circuit can change the loop gain of said PLL circuit stepwise from the high level to the low level.

8. A write clock generation circuit for generating write clock from wobble signal based on a wobbling track formed on a recording medium, comprising:
   a subtractor that produces wobble signal by subtracting respective signals from a photo detector divided into at least two portions with a dividing line in a tangential direction of the track;
   a variable gain amp that amplifies the wobble signal output from said subtractor at a determined gain;
   a gain control circuit that determines the gain of said variable gain amp in a particular period immediately after data-writing has been started by varying the gain of said variable gain amp stepwise;
   a wobble amplitude regulation AGC circuit that automatically controls gain thereof so as to regulate amplitude of the wobble signal output from said variable gain amp;
   a making-binary circuit that digitizes signals output from said wobble amplitude regulation AGC circuit into made-binary wobble signal; and
   a PLL circuit that generates write clock using the made-binary wobble signal as a reference.

9. The write clock generation circuit as claimed in claim 8, wherein said gain control circuit once reduces the gain of said variable gain amp to a level lower than a gain level of data-reading in the particular period immediately after data-writing has been started, and increases stepwise to gain of said variable gain amp to a gain level of data-reading.

10. The write clock generation circuit as claimed in claim 8, wherein said gain control circuit varies gain steps and time intervals of said variable gain amp to an extent in which said wobble amplitude regulation AGC circuit can follow in the particular period immediately after data-writing has been started.

11. The write clock generation circuit as claimed in claim 8, wherein said gain control circuit switches the gain of said variable gain amp before data-writing is begun in accordance with whether a preceding region to data-writing starting position is data-written or data-not-yet-written, so that amplitude of the wobble signal immediately before the data-writing starts and amplitude of the wobble signal immediately after the data-writing starts become substantially equal.

12. The write clock generation circuit as claimed in claim 8, further comprising a PLL gain control circuit that determines loop gain of said PLL circuit so as to increase the loop gain in a predetermined time period immediately after the beginning of data-writing.

13. The write clock generation circuit as claimed in claim 12, wherein said PLL gain control circuit sets the loop gain of said PLL circuit at a high level in a predetermined time period just after the beginning of data-writing and then, sets the loop gain at a low level.

14. The write clock generation circuit as claimed in claim 13, wherein said PLL gain control circuit can change the loop gain of said PLL circuit stepwise from the high level to the low level.

15. An optical disk apparatus, comprising:
- a rotation mechanism that rotates a recording medium, wherein a wobbling track is formed on a recording surface of the recording medium;
- an optical pickup comprising a photo detector divided into at least two portions by a dividing line in a tangential direction of the track, and a laser light source that emits a laser beam to the recording medium;
- a light source driving circuit that controls the light emission of the light source; and
- the write clock generation circuit as claimed in claim 1 that receives signals output by the divided photo detector, and outputs write clock to said light source driving circuit.

16. An optical disk apparatus, comprising:
- a rotation mechanism that rotates a recording medium, wherein a wobbling track is formed on a recording surface of the recording medium;
- an optical pickup comprising a photo detector divided into at least two portions by a dividing line in a tangential direction of the track, and a laser light source that emits a laser beam to the recording medium;
- a light source driving circuit that controls the light emission of the light source; and
- the write clock generation circuit as claimed in claim 8 that receives signals output by the divided photo detector, and outputs write clock to said light source driving circuit.

* * * * *